United States Patent
Walker et al.

(10) Patent No.: US 10,193,823 B2
(45) Date of Patent: Jan. 29, 2019

(54) RICH RESOURCE MANAGEMENT INCORPORATING USAGE STATISTICS FOR FAIRNESS

(71) Applicant: Microsoft Technology Licensing, LLC, Redmond, WA (US)

(72) Inventors: Marc Andrew Walker, Lake Stevens, WA (US); Pavel Michailov, Redmond, WA (US); Svyatoslav Trukhanov, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 15/262,605

(22) Filed: Sep. 12, 2016

(65) Prior Publication Data

US 2018/0077079 A1 Mar. 15, 2018

(51) Int. Cl.

| | |
|---|---|
| *H04L 12/26* | (2006.01) |
| *H04L 12/927* | (2013.01) |
| *H04L 29/06* | (2006.01) |
| *H04L 12/917* | (2013.01) |
| *H04L 5/00* | (2006.01) |

(52) U.S. Cl.
CPC .......... *H04L 47/80* (2013.01); *H04L 43/0876* (2013.01); *H04L 47/76* (2013.01); *H04L 67/42* (2013.01); *H04L 5/0075* (2013.01)

(58) Field of Classification Search
None
See application file for complete search history.

(56) References Cited

U.S. PATENT DOCUMENTS

| | | | |
|---|---|---|---|
| 6,092,178 A | 7/2000 | Jindal et al. | |
| 7,133,891 B1 | 11/2006 | Uceda-Sosa et al. | |
| 7,254,626 B1 | 8/2007 | Kommula et al. | |
| 7,388,839 B2 | 6/2008 | Chafle et al. | |
| 8,306,961 B2 | 11/2012 | Bethlehem et al. | |
| 8,782,225 B2 | 7/2014 | Bali et al. | |
| 9,185,012 B2 | 11/2015 | Richardson et al. | |
| 2005/0033809 A1 | 2/2005 | McCarthy et al. | |

(Continued)

OTHER PUBLICATIONS

Roth, Gregor, "Server load balancing architectures, Part 1: Transport-level load balancing", Published on: Oct. 21, 2008 Available at: http://www.javaworld.com/article/2077921/architecture-scalability/server-load-balancing-architectures-part-1--transport-level-load-balancing.html.

*Primary Examiner* — Natisha D Cox
(74) *Attorney, Agent, or Firm* — Workman Nydegger

(57) ABSTRACT

A system includes a processor and memory to execute an application. The application receives feedback from a target regarding ability of a plurality of resources of the target to service requests from one or more clients. The feedback includes a metric indicative of a load of each of the resources. The application calculates weights for the resources based on the feedback. A weight for a resource is based on a product of a first term that determines a maximum difference in probabilities of selection between two resources and a second term including an exponent that is a difference between a current load of the resource and a current minimum load across the resources determined based on the feedback. The application selects, for servicing a request from one of the clients, one of the resources in round robin manner based on the weights to evenly utilize the plurality of resources.

20 Claims, 7 Drawing Sheets

(56) References Cited

U.S. PATENT DOCUMENTS

| | | |
|---|---|---|
| 2007/0136311 A1 | 6/2007 | Kasten et al. |
| 2009/0157678 A1* | 6/2009 | Turk ................. G06F 17/30289 |
| 2011/0238733 A1 | 9/2011 | Yoo et al. |
| 2013/0055260 A1* | 2/2013 | Zlotkin ................. G06F 9/4856 |
| | | 718/1 |
| 2014/0282503 A1* | 9/2014 | Gmach ............... H04L 41/0823 |
| | | 718/1 |
| 2015/0134795 A1 | 5/2015 | Theimer et al. |
| 2015/0215394 A1* | 7/2015 | Nemoto ................. G06F 9/505 |
| | | 709/202 |
| 2015/0312921 A1* | 10/2015 | Du ....................... H04W 24/02 |
| | | 370/252 |

\* cited by examiner

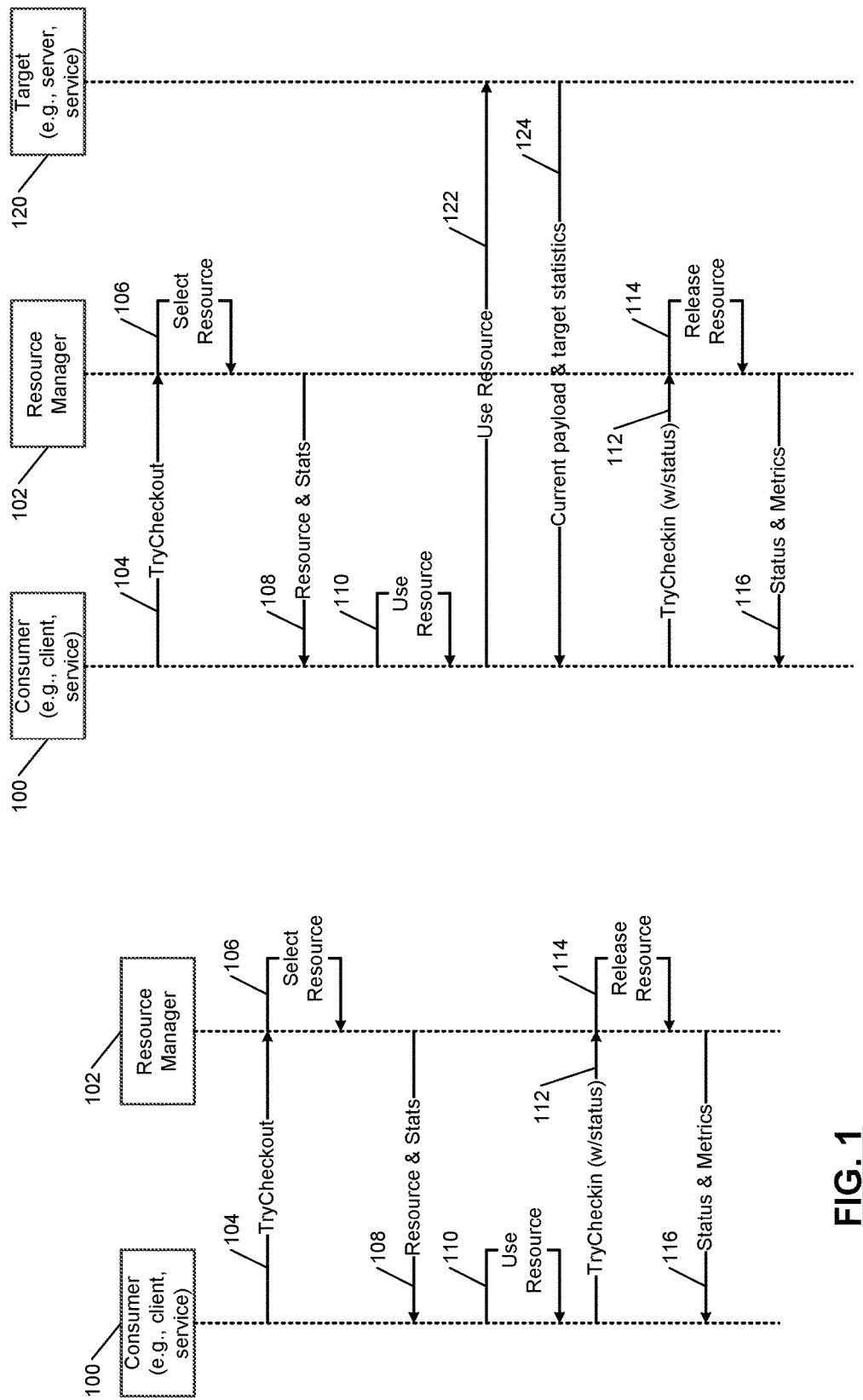

RICH RESOURCE MANAGEMENT INCORPORATING USAGE STATISTICS FOR FAIRNESS

FIELD

The present disclosure relates to resource management computing systems.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In computing systems (e.g., data processing systems, communication systems, and so on), the response time depends on the number and availability of resources (e.g., connections between a source and a target). For example, in a network environment, multiple clients may utilize a service provided by a server via multiple connections to the server. In some situations, a single client may utilize a service provided by a server via multiple connections to the server. In other examples, two services (e.g., applications) may communicate with each other by utilizing multiple connections between them. In these examples, the connections are examples of the resources utilized by the clients and services. The number and availability of these resources affect the response times experienced by the clients and services.

SUMMARY

A system comprises a processor and memory and an application executed by the processor and memory. The application is configured to receive feedback from a target regarding ability of a plurality of resources of the target to service requests from one or more clients. The feedback includes a metric indicative of a load of each of the resources. The application is configured to calculate weights for the resources based on the feedback. A weight for a resource is based on a product of a first term that determines a maximum difference in probabilities of selection between two resources and a second term including an exponent that is a difference between a current load of the resource and a current minimum load across the resources determined based on the feedback. The application is configured to select, for servicing a request from one of the clients, one of the resources in round robin manner based on the weights of the resources to evenly utilize the plurality of resources.

In other features, the application is further configured to calculate an array from the weights of the resources using a cumulative distribution function and to select a number within bounds of the array to select one of the resources.

In other features, the application is further configured to calculate the current load of the resource based on a moving average of a predetermined number of metrics for the resource received during a predetermined time and to calculate the weight of the resource based on the current load of the resource.

In other features, the application is further configured to allocate the selected resource for use by a single thread at a time or by a plurality of threads concurrently.

In other features, the second term includes a number greater than 0 and less than or equal to 1 with the exponent and determines a rate at which a probability of selection of the resource decreases as the load of the resource increases.

In other features, the application is further configured to receive an additional feedback from a client after the client uses a resource, the additional feedback indicating inability of the used resource to service a future request. The application is further configured to, in response to one or more of the resources being currently unable to service the future request, keep the used resource available to service the future request based on the additional feedback.

In other features, the application is further configured to determine maximum lifetimes of the resources in a manner that prevents deletion of multiple resources at the same time based on the feedback.

In other features, the application is further configured to discontinue using a resource for a period of time instead of deleting the resource based on the feedback and to begin reusing the resource after the period of time.

In other features, the application is further configured to define a maximum time for which a resource is allocated and to reclaim the resource that remains allocated for more than the maximum time.

In other features, the application is further configured to define maximum and minimum number of resources and to adjust a number of resources between the maximum and minimum number of resources.

In other features, the application is further configured to select a resource within a maximum predetermined time.

In still other features, a method executed by a server for managing resources of a target servicing requests from one or more clients, comprises receiving feedback from the target regarding ability of the resources of the target to service requests from the one or more clients. The feedback includes a metric indicative of a load of each of the resources. The method further comprises calculating weights for the resources based on the feedback. A weight for a resource is based on a product of a first term that determines a maximum difference in probabilities of selection between two resources and a second term including an exponent that is a difference between a current load of the resource and a current minimum load across the resources determined based on the feedback. The method further comprises selecting, for servicing a request from one of the clients, one of the resources in round robin manner based on the weights of the resources to evenly utilize the resources.

In other features, the method further comprises calculating an array from the weights of the resources using a cumulative distribution function and selecting a number within bounds of the array to select one of the resources.

In other features, the method further comprises calculating the current load of the resource based on a moving average of a predetermined number of metrics for the resource received during a predetermined time. The method further comprises calculating the weight of the resource based on the current load of the resource.

In other features, the method further comprises allocating the selected resource for exclusive use by a single thread at a time or by a plurality of threads concurrently.

In other features, the second term includes a number greater than 0 and less than or equal to 1 with the exponent and determines a rate at which a probability of selection of the resource decreases as the load of the resource increases.

In other features, the method further comprises receiving an additional feedback from a client after the client uses a resource, the additional feedback indicating inability of the used resource to service a future request. The method further comprises, in response to one or more of the resources being currently unable to service the future request, keeping the used resource available to service the future request based on the additional feedback.

In other features, the method further comprises determining maximum lifetimes of the resources in a manner that prevents deletion of multiple resources at the same time based on the feedback. The method further comprises discontinuing using a resource for a period of time instead of deleting the resource based on the feedback and beginning reusing the resource after the period of time. The method further comprises defining a maximum time for which a resource is allocated and reclaiming the resource that remains allocated for more than the maximum time. The method further comprises defining maximum and minimum number of resources and adjusting a number of resources between the maximum and minimum number of resources. The method further comprises selecting a resource within a maximum predetermined time.

In still other features, a server configured to execute an application for managing resources of a target servicing requests from one or more clients, comprises a processor and memory configured to execute the application. The application executed by the processor and memory is configured to receive feedback from the target regarding ability of the resources of the target to service requests from the one or more clients. The feedback includes a metric indicative of a load of each of the resources. The application is further configured to calculate a current load of each of the resources based on a moving average of a predetermined number of metrics for the respective resources received from the target during a predetermined time. The application is further configured to calculate weights for the resources based on the feedback. A weight for a resource is based on a product of a first term that determines a maximum difference in probabilities of selection between two resources and a second term that includes a number greater than 0 and less than or equal to 1 with an exponent that is a difference between the current load of the resource and a current minimum load across the resources determined based on the feedback. The application is further configured to select, for servicing a request from one of the clients, one of the resources in round robin manner based on the weights of the resources to evenly utilize the resources.

In other features, the application is further configured to calculate an array from the weights of the resources using a cumulative distribution function and to select a number within bounds of the array to select one of the resources.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 depicts an example of resource flow between a consumer (e.g., a client or a service) and a resource manager;

FIG. 2 depicts an example of resource flow between a consumer (e.g., a client or a service), a resource manager, and a target (e.g., a server or a service);

In the drawings, reference numbers may be reused to identify similar and/or identical elements.

DETAILED DESCRIPTION

Figure 3:
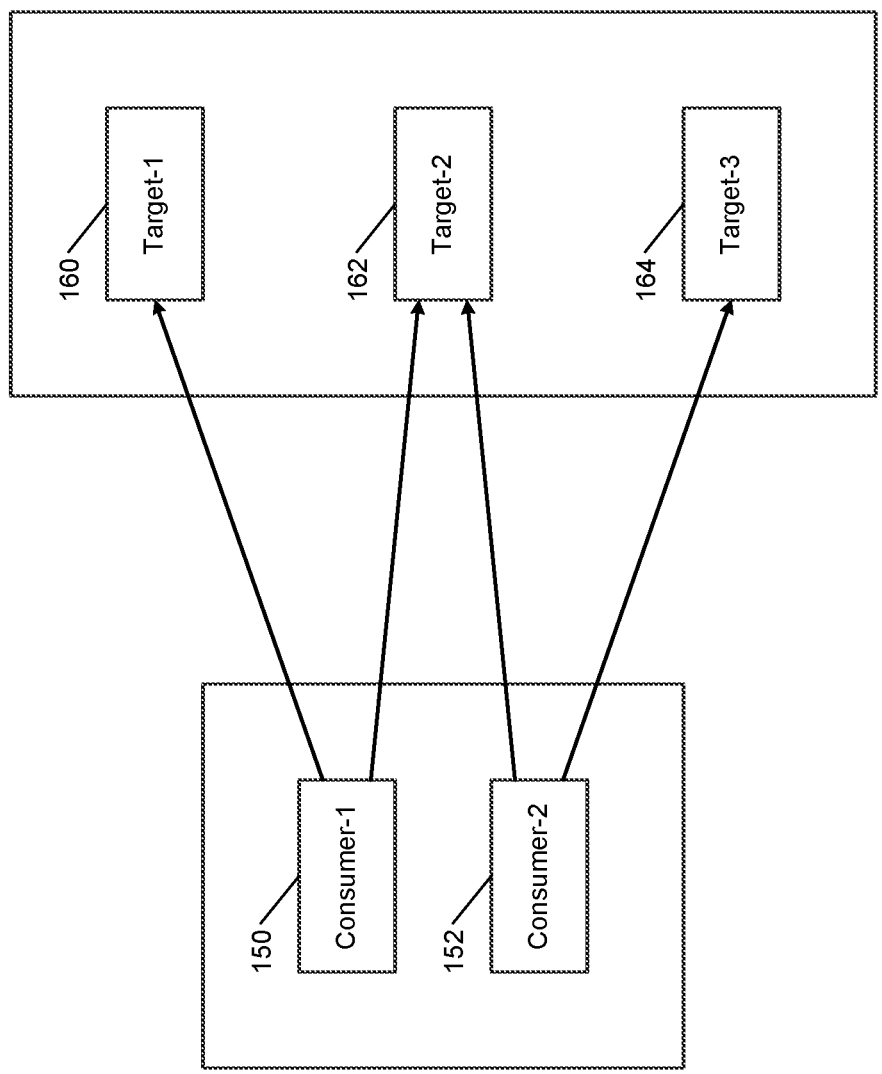
FIG. 3 depicts an example of multiple connections between multiple consumers and multiple targets.

The present disclosure relates to systems and methods for resource management. Specifically, a resource manager receives feedback regarding status of resources provided by a target (e.g., a server or a service) to a consumer (e.g., a client or a service). For example, the status may be in the form of a metric that indicates load on each resource of the target. The resource manager aggregates these metrics for each resource using a moving average. The resource manager calculates weights for each resource based on the aggregated data. On receiving a request for a resource (e.g., from a client), the resource manager selects a resource using an exponential weighted round robin method. These and other aspects of the present disclosure are described below in detail.

The present disclosure is organized as follows. An overview of the aspects of the present disclosure is first presented with reference to FIGS. 1-5. Subsequently, examples of implementations of these aspects are presented with reference to FIGS. 6-11.

Generally, when communicating between a client and a service, or between two services, there is a many to many relationship between requests of the client and resources of the service. Presently, client libraries do not take into consideration the health of the service (e.g., load-handling capability or ability of the resources to service requests) other than the latency of the call, which is not always an accurate basis for selecting resources to service requests. For example, the .Net framework utilizes a connection pool for maintaining connections between services. The connections are shared primarily on a last in first out (LIFO) basis. Accordingly, if a connection between a client and a service node is failing fast, the connection will actually be used more often than desired. Current connection models also do not allow closing the connection in this case.

The present disclosure proposes using a resource manager library that allows maintenance and selection of resources using methods that enable the client to use feedback from the service in order to make an appropriate selection of the resource needed. Ultimately this selection method equalizes the load on each service node (resource) even when multiple clients are used.

The present disclosure proposes systems and methods to provide a resource manager library that controls lifecycle and usage of resources such that each resource is fairly (i.e., evenly or uniformly) used based on per resource metric; the number of available resources is dynamically controlled; a resource is exclusively used by only one consumer thread at a time or is shared by a plurality of threads concurrently; and the lifetime, minimum age, and maximum age of the resources are maintained. The resource manager library can be used to control connections between a client and a target by controlling how traffic is distributed across connections with fairness, controlling how connections are created and destroyed, and ensuring that connection lifetime is maintained.

Using the resource manager library provides a feedback mechanism and a resource selection protocol to ensure overall equal usage between resources in a many client to many server relationship. Current methodologies do not take the load on the server into consideration, nor consider statistics for the resources before resource selection. Incorporating the resource manager library in communication pipeline enables the opportunity to fully utilize all resources on the service.

While the present disclosure explains the overall design in the context of connection management, the infrastructure can be used for any resource that needs to be managed. The resource manager library can be used in the role of a client and a target. In the case of connection, the resource manager library can be a client and a target node. The client aspect controls the connection management and aggregation of metrics as described below in detail. The target component detects the presence of the client library and responds to signals from the client library, for example, with an indication that a connection should be closed, and by adding metrics to the response including health metrics.

FIG. 1 shows an example of a resource flow. A consumer 100 requests a resource from a resource manager 102 (shown as "TryCheckout") at 104. The resource manager 102 selects a resource from a resource pool and provides the resource to the consumer 100 at 106. The resource manager 102 also provides the consumer 100 statistics about the usage of the resource with the resource at 108. The consumer 100 uses the resource at 110. The consumer 100 returns or releases the resource after use to the resource manager 102 with the status of the resource (shown as "TryCheckin") at 112. The resource manager 102 releases the resource back into the resource pool at 114. The resource manager 102 returns the status and health metrics of the resource to the consumer 100 at 116. In order to facilitate fairness and optimize the resource selection, on check-in, a usage or load value is provided for the resource.

FIG. 2 shows an example of a resource flow for a named connection (e.g., when the consumer 100 requests a http connection to a target 120). The consumer 100 requests a resource from the resource manager 102 (shown as "TryCheckout") at 104. The resource manager 102 selects a resource from a resource pool and provides the resource to the consumer 100 at 106. The resource manager 102 also provides the consumer 100 statistics about the usage of the resource with the resource at 108. The consumer 100 uses the resource to connect to the target 120 at 122. The target 120 returns appropriate usage statistics for the resource back to the consumer 100 at 124. The consumer 100 returns or releases the resource after use to the resource manager 102 with the status of the resource (shown as "TryCheckin") at 112. The resource manager 102 releases the resource back into the resource pool at 114. The resource manager 102 returns the status and health metrics of the resource to the consumer 100 at 116.

The usage statistics from the target are useful for connection management. For example, consider a scenario including two instances of the consumer connecting to three instances of the target. It may be desirable to ensure that the load on the target is even (uniform) across all three nodes. One solution to ensure this may include adding an aggregation model to count how many times each target is used and to arrive at a relative load for each target. However, this may increase complexity and add failure points. Instead, the target itself already knows its own actual load. This information can be passed back to the consumer and used for the selection process.

FIG. 3 shows composite connections including multiple connections to the same target from two nodes. For example, Consumer-1 150 and Consumer-2 152 have connections to Target-1 160, Target-2 162, and Target-3 164. If Consumer-1 150 and Consumer-2 152 are using the connections evenly, the load on Target-2 162 would be twice as high as the load on Target-1 160 and Target-3 164. When Target-2 162 provides feedback to each consumer regarding the load, the selection process for the targets should be able to evenly distribute the load such that the overall load on the three targets is even, and each consumer is using Target-2 162 less often than the other targets.

In the present disclosure, in order to manage the connection resources or any resource with explicit fairness, a resource manager is defined and used to manage objects. The resource manager enables the ability to define shared patterns for resource health tracking, resource selection, and resource lifetime management. By using the shared patterns, additional resources can be managed with minor additions to the library. Each method that calls into the resource manager returns a MethodStatus object providing information about the call.

The resource manager performs resource selection as follows. When a client needs to use a resource, a call (TryCheckout) is made to the resource manager to 'checkout' a resource. An available resource is selected, indicated as locked (allocated), and returned to the caller. If resources are unavailable, and a total resource capacity is not reached, a new resource is created. If resources are unavailable, and the total resource capacity is reached, a Failed status is returned to the caller.

Figure 4:
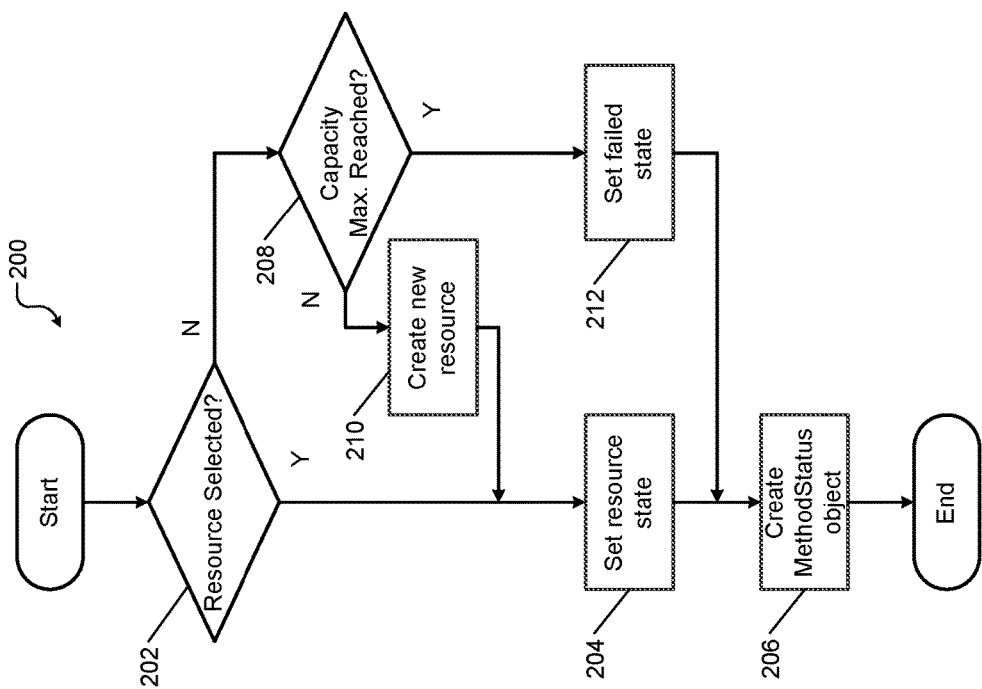
FIG. 4 is a flowchart of an example of a method for allocating a resource from a resource pool.

FIG. 4 shows an example of a resource selection method (TryCheckout) 200. At 202, control determines whether a resource is selected. If a resource is selected, control sets the resource state at 204, control creates a MethodStatus object at 206, and control ends. If a resource is not selected, control checks whether maximum resource capacity is reached at 208. If maximum resource capacity is not reached, control creates a new resource at 210, and control proceeds to 204. If maximum resource capacity is reached, control sets a failed state at 212, and control proceeds to 206.

When the caller is finished using the resource, the resource is 'released' or checked in (TryCheckin). The resource is unlocked when the resource is checked in. The consumer (caller) also provides a metric corresponding to the resource health to be used for the selection process. The caller can also indicate that the resource should be disposed if the resource is no longer valid. If a resource is orphaned (not released by called within a predetermined time), a maximum checkout time is provided for the resource so that the orphaned resource can be reclaimed and made available in the pool of resources.

Figure 5:
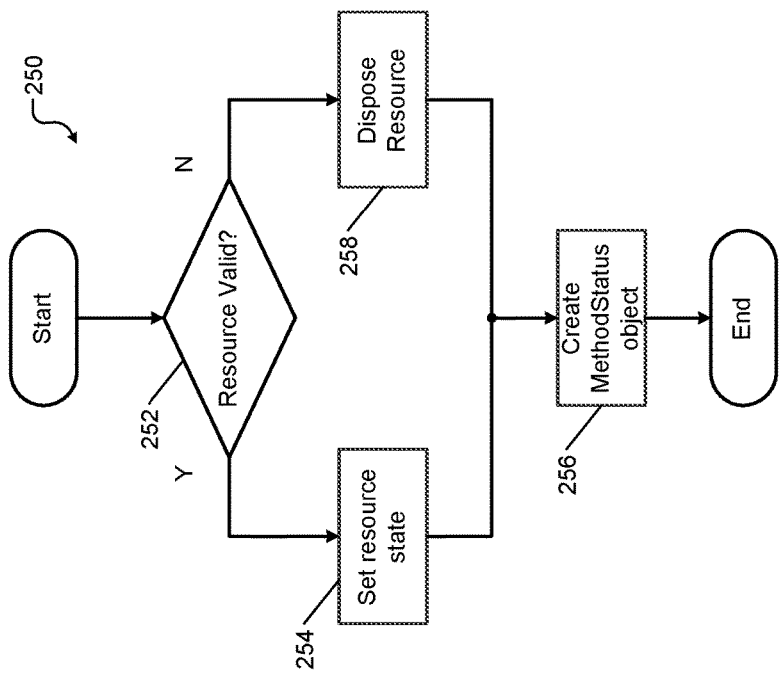
FIG. 5 is a flowchart of an example of a method for returning a resource to a resource pool.

FIG. 5 shows an example of a resource return (release) method (TryCheckin) 250. At 252, control determines whether the resource is valid. If a resource is valid, control sets the resource state at 254, control creates a MethodStatus object at 256, and control ends. If the resource is not valid, control disposes the resource at 258, creates a MethodStatus object at 256, and ends.

The resource manager includes a plurality of configuration parameters for lifecycle management of the resources. Examples of the configuration parameters include the following.
1. MaximumCheckoutDuration—Maximum time a resource can be checked out.
2. MaximumLockWait—Maximum wait time for selection of a resource.
3. MaxiumPoolSize—Maximum number of resources in the resource pool.
4. MaximumResourceLifetime—Maximum lifetime for a resource.
5. MinimumPoolSize—Minimum number of resources in the resource pool.
6. MinimumResourceLifetime—Minimum lifetime for a resource.
7. ResourceLifetimeSkew—Variation on lifetime so multiple resources are not deleted at the same time.
8. ResourceSelectionMethod—Method of resource selection.

The resource manager uses these configuration parameters to perform the following actions:
1. Expansion—The resource pool can be expanded up to the MaxiumPoolSize if the number of required resources is greater than the number of resources currently in the resource pool.
2. Contraction—The resource pool can be reduced (scaled down) to the MinimumPoolSize if the number of required resources is less than the number of resources currently in the resource pool.
3. Reclaim—A resource that has been checked out for greater than the MaximumCheckoutDuration can be reclaimed (unlocked and released back in the resource pool).
4. Refresh—A resource can be recreated periodically; the resource manager can rediscover all of the targets in the system by refreshing the resource via recreating the resource.

The resource manager can use one of two methods for selecting a resource from the pool of resources: a round robin method and an exponential weighted round robin method. In the round robin method, if the available nodes are healthy, each available node has equal probability for being selected. The selection is based on the last used time for the resource, with the oldest used resource being used first, simulating a queue. A node that is not healthy or currently used is skipped from consideration.

The exponential weighted round robin method is based on the overall load tracking for the object. The higher the load, the least likely the resource is selected. This is useful in a many-client to many-resources situation as describe above with reference to FIG. 2, which occurs when communicating between two services, for example. In the exponential weighted round-robin method, weights are calculated for each resource based on the last known load of the resource.

The weight is calculated as follows: $\min(a*b^{(load-minLoad)}, 1)$
Where:
1. a: A load-multiplier and determines the maximum difference in probability between two resources.
2. b: A value between (0 . . . 1] and determines how quickly the probability falls off to the minimum value at higher loads.
3. minLoad: Current minimum load across all resources.
4. load: load of the resource being evaluated, preferably aggregated using a moving average method.

Once the weight of each resource is known, an array is calculated from all weights, and a random number is generated within the bounds of the array to determine which resource will be selected.

Following is an example of the weight calculation and resource selection. Suppose a resource manager with the following configuration:
1. Current loads of resources (preferably aggregated using a moving average method): [10, 5, 7, 12, 4]
2. a=10 (indicating how likely an unloaded resource will be selected over a loaded resource)
3. b=0.9 (indicating how quickly the probability of a resource will drop off as the load on the resource increases (or how the load translates into reduction of probability))
minLoad=4 (see current loads of resources above)
Individual weights of resources (calculated using $(a*b^{(load-minLoad)}))$=[5, 9, 7, 4, 10]
Cumulative distribution function (CDF)=[5, 14, 21, 25, 35], where 14=5+9, 21=5+9+7, 25=5+9+7+4, and 35=5+9+7+4+10.

A random number is generated between [0 . . . 35], where 35 is a cumulative accumulated weight, and a resource in the CDF with a value greater than or equal to the random number is selected. For example, if the random number is 17, the resource with the value 21 in the CDF is selected.

The loads of the resources (e.g., the current loads of resources: [10, 5, 7, 12, 4] in the example above) are arrived at using an aggregation method. The aggregation of loads per resource is performed by using SimpleMovingAverage set up by aggregating the last n load values per resource. Once the overall capacity (n) of number of load values per resource is reached, for every new load value added for a resource, the oldest load value for the resource is discarded. Since this aggregation method is not time based, the aggregation method does not require a timer. However, the aggregation method is dependent on incoming rate of load values. Therefore, when this aggregation method is used, the resource manager takes into consideration the trustworthiness of the aggregate load value based on last aggregation time, which is a configurable value.

In the use case of the resource manager, the messaging between the consumer and the target is augmented for connection management. This allows the client node to have the information about the overall health of all the resource targets as a whole, and the client node uses this information for determining how to maintain a connection.

Presently, when a connection is made between two services, assumptions are made by the client as to when the connection should be closed. For example, the connection is closed based on error codes, or based on some signals from the service. If too many connections are created in a period of time, port saturation may occur. For example, the TCP protocol by default has a time_wait for every TCP port used before re-use to allow network traffic to drain. Since the client can has a perspective of overall health of a target resource, the client can make a more informed decision on when a connection is to be closed.

When the client calls an endpoint, based upon detected health, the client will add a header to the request (e.g., x-ms-connection) with two values that the service node can use to initiate a close request.

CanClose—If the target node is unhealthy (high load), the connection can be closed by the target node (e.g., by adding connection:close to the response).

KeepOpen—Even when the target node is unhealthy, the service node should not initiate closure of the connection.

By default, the value passed by the client will be 'CanClose'. However, when multiple nodes are unhealthy, to prevent meltdown of both the consumer and the target, the value will be changed to 'KeepOpen' so that the service node does not initiate closure of the connection. The connection will still be closed by the consumer when it gets a well-known connection error that indicates the service node does not exist because of scaling down.

In addition to closing the connection when the service node is unhealthy (high load), an unhealthy node can be further segregated via a quarantine of the connection for a period of time so that the node has time to cool down. If all of the resources are quarantined, selection will occur across the quarantined connections, with the expectation that the consumer will be tracking the overall resource health for the targets and will use a different set of targets.

Figure 10:
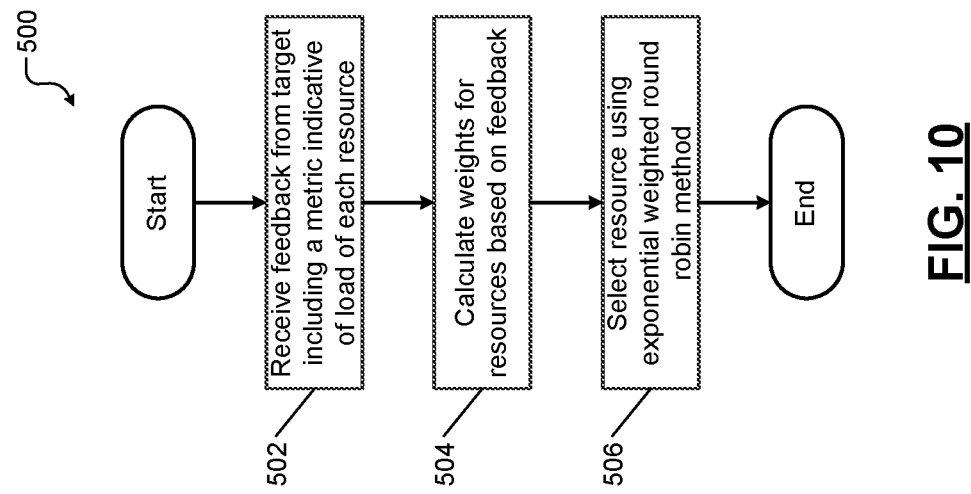
FIG. 10 is a flowchart of an example of a method for managing resources using a resource manager.
Figure 11:
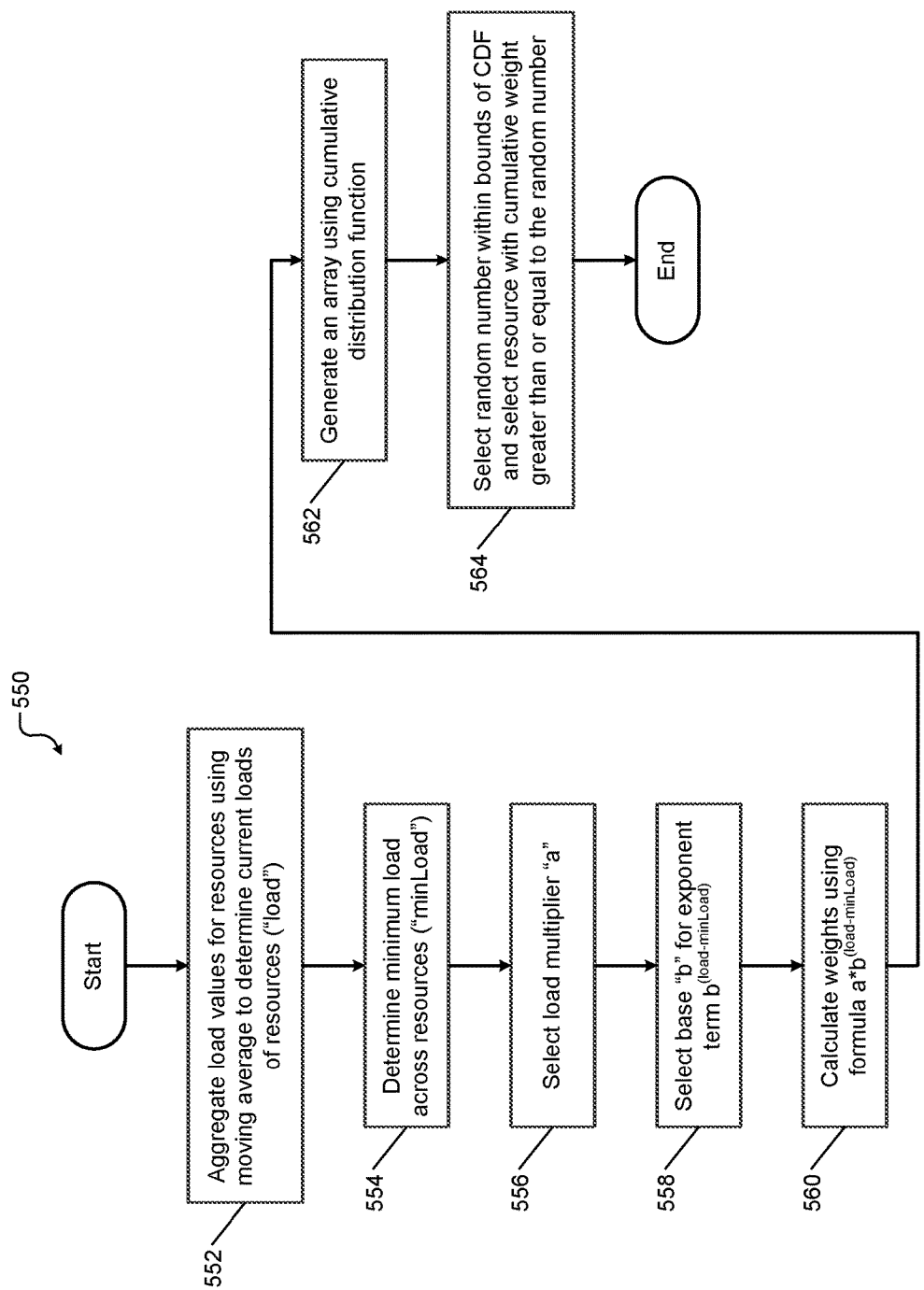
FIG. 11 is a flowchart of an example of a method for aggregating load, calculating weights, and selecting resources using a resource manager.

Following are examples of implementations of these aspects of the present disclosure. FIGS. 6-9 disclose examples of systems implementing these aspects. FIGS. 10 and 11 disclose examples of methods implementing these aspects.

Figure 6:
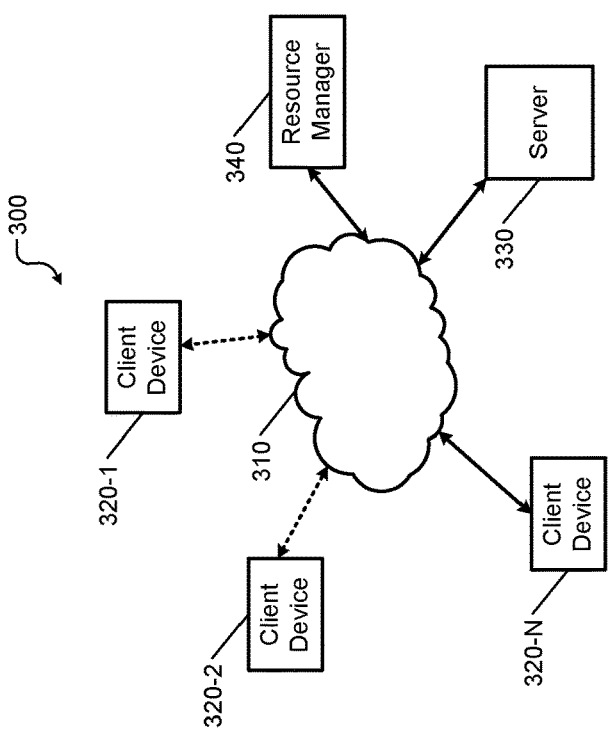
FIG. 6 is a functional block diagram of an example of a distributed communications system including multiple client devices, a server, and a resource manager to manage resources between the multiple client devices and the server.

FIG. 6 shows a simplified example of a distributed communication system 300 including a resource manager that manages resources between a plurality of clients and a server as described above with reference to FIGS. 1-5. While a single server is shown, the teachings are equally applicable to resource management between a plurality of clients and a plurality of servers as described above with reference to FIGS. 1-5. Further, the teachings are equally applicable to resource management between two services (e.g., applications) as described above with reference to FIGS. 1-5.

The distributed communication system 300 includes a network 310, one or more client devices 320-1, 320-2, . . . , and 320-N (collectively client devices 320) (where N is an integer greater than or equal to one), a server 330, and a resource manager 340. The network 310 may include a local area network (LAN), a wide area network (WAN) such as the Internet, or other type of network (collectively shown as the network 310). The client devices 320 communicate with the server 330 via the network 310. The client devices 320 and the server 330 may connect to the network 310 using wireless and/or wired connections to the network 310. Examples of the client devices 320 include smartphones, personal digital assistants (PDAs), laptop computers, personal computers (PCs), and so on. The server 330 provides one or more services to the client devices 320.

The resource manager 340 manages connections between the one or more client devices 320 and the server 330. For example, the resource manager 340 may manage connections between an application running on one of the client devices 320 and an application running on the server 330. Additionally, the resource manager 340 may manage connections between applications running on the client devices 320 and an application (or applications) running on the server 330.

The resource manager 340 uses a method for maintenance and selection of resources that enables the client device 320 to use feedback from the server 330 in order to make an appropriate selection of the resource needed. Ultimately this selection method equalizes the load on each service node (resource) of the server 330.

The resource manager 340 controls lifecycle and usage of the resources provided by the server 330 such that each resource is fairly used based on per resource metric; such that each resource is fairly used based on a per resource metric; the number of available resources is dynamically controlled; a resource is exclusively used by only one consumer thread at a time or is shared by a plurality of threads concurrently; and the lifetime, minimum age, and maximum age of each resource are maintained. The resource manager 340 controls connections between a client device 320 and the server 330 (target) by controlling how traffic is distributed across connections with fairness, controlling how connections are created and destroyed, and ensuring that connection life time is maintained.

The resource manager 340 provides a feedback mechanism and selection protocol to ensure overall uniform resource usage between the client devices 320 and the server 330. The resource manager 340 takes into account the load on the server 320 and statistics for the resources before selection. The resource manager 340 enables the opportunity to fully utilize all resources on the server 320. While the present disclosure explains functions and operations of the resource manager 340 in the context of connection management, the resource manager 340 can be used for any resource that needs to be managed. The resource manager 340 can be used as a client and a target. In the case of connection, the client aspect controls the connection management and aggregation of metrics. The target component provides response with an indication that a connection should be closed, and by adding metrics to the response including health metrics. The functions and operations of the resource manager 340 are explained below in further detail with reference to FIG. 9.

Figure 7:
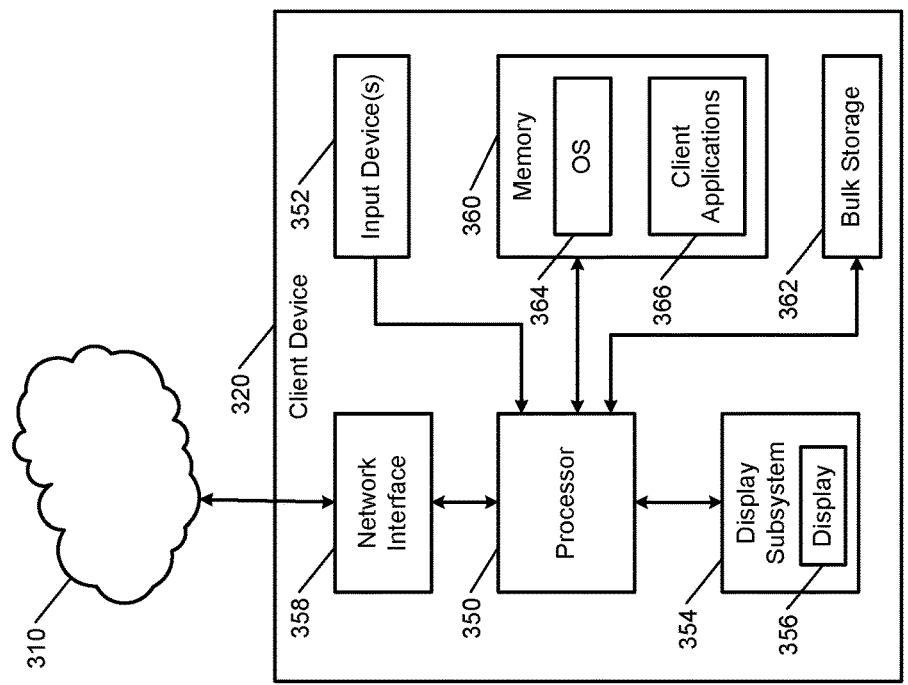
FIG. 7 is a functional block diagram of an example of a client device.

FIG. 7 shows a simplified example of the client device 320. The client device 320 is similar to the Consumer 100 of FIGS. 1 and 2, and the Consumer-1 150 and the Consumer-2 152 of FIG. 3. The client device 320 typically includes a central processing unit (CPU) or processor 350, one or more input devices 352 (e.g., a keypad, touchpad, mouse, and so on), a display subsystem 354 including a display 356, a network interface 358, a memory 360, and a bulk storage 362.

The network interface 358 connects the client device 320 to the distributed communication system 300 via the network 310. For example, the network interface 358 may include a wired interface (e.g., an Ethernet interface) and/or a wireless interface (e.g., a Wi-Fi, Bluetooth, near field communication (NFC), or other wireless interface). The memory 360 may include volatile or nonvolatile memory, cache, or other type of memory. The bulk storage 362 may include flash memory, a hard disk drive (HDD), or other bulk storage device. The processor 350 of the client device 320 executes an operating system (OS) 364 and one or more client applications 366 including an application to connect the client device 320 to the server 330 and to access one or more services provided by the server 330 via the network 310.

Figure 8:
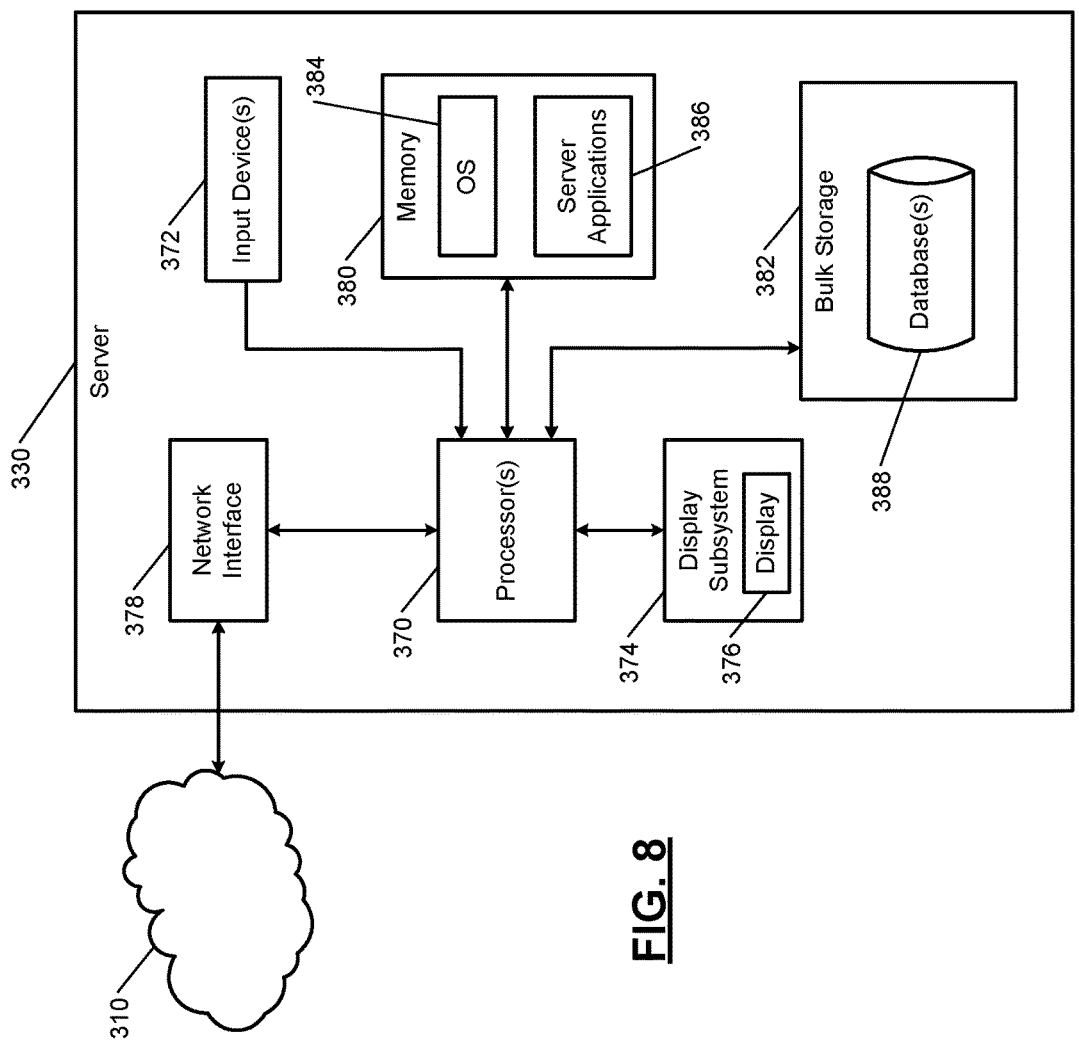
FIG. 8 is a functional block diagram of an example of a server.

FIG. 8 shows a simplified example of the server 330. The server 330 is similar to the target 120 of FIG. 2; and the Target-1 160, the Target-2 162, and the Target-3 164 of FIG. 3. The server 330 provides one or more services to the one or more client devices 320 via the network 310. The server 330 typically includes one or more CPUs or processors 370, one or more input devices 372 (e.g., a keypad, touchpad, mouse, and so on), a display subsystem 374 including a display 376, a network interface 378, a memory 380, and a bulk storage 382.

The network interface 378 connects the server 330 to the distributed communication system 300 via the network 310. For example, the network interface 378 may include a wired interface (e.g., an Ethernet interface) and/or a wireless interface (e.g., a Wi-Fi, Bluetooth, near field communication (NFC), or other wireless interface). The memory 380 may include volatile or nonvolatile memory, cache, or other type of memory. The bulk storage 382 may include flash memory, one or more hard disk drives (HDDs), or other bulk storage device. The processor 370 of the server 330 executes an operating system (OS) 384 and one or more server applications 386. The bulk storage 382 may store one or more databases 388 that store data structures used by the server applications 386 to perform respective functions.

Figure 9:
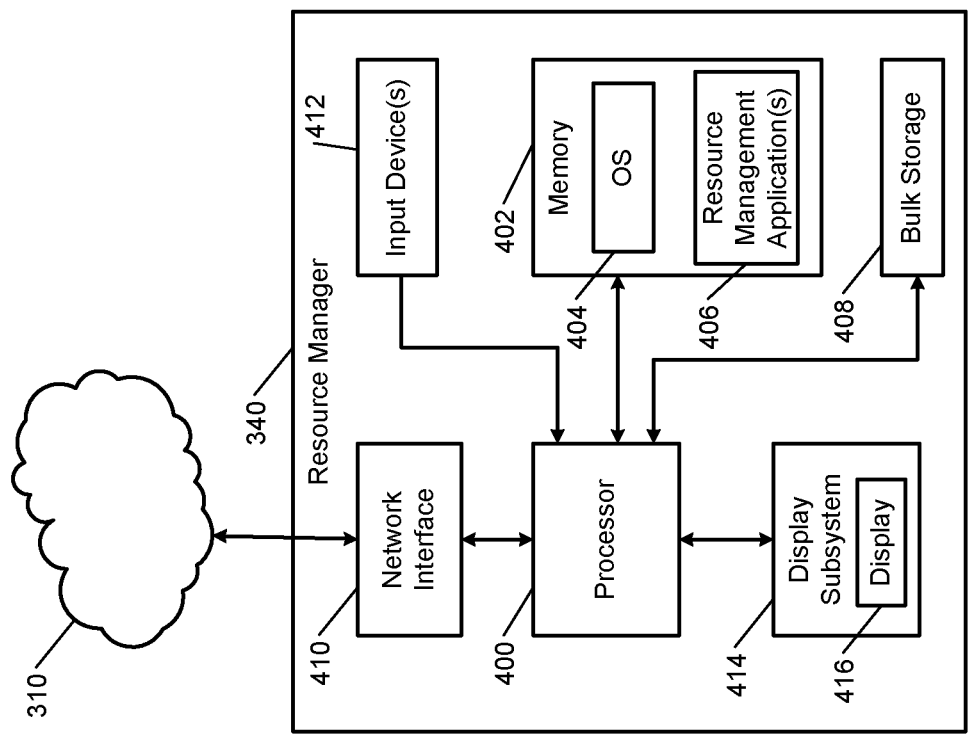
FIG. 9 is a functional block diagram of an example of a resource manager.

FIG. 9 shows a simplified example of the resource manager 340. The resource manager 340 is similar to the resource manager 102 of FIGS. 1 and 2 and the resource manager described with reference to FIGS. 1-5. The resource manager 340 typically includes a central processing unit (CPU) or processor 400, a memory 402, a bulk storage 408, a network interface 410, one or more input devices 412 (e.g., a keypad, touchpad, mouse, and so on), and a display subsystem 414 including a display 416.

The network interface 410 connects the resource manager 340 to the distributed communication system 300 via the network 310. For example, the network interface 410 may include a wired interface (e.g., an Ethernet interface) and/or a wireless interface (e.g., a Wi-Fi, Bluetooth, near field communication (NFC), or other wireless interface). The memory 402 may include volatile or nonvolatile memory, cache, or other type of memory. The bulk storage 408 may include flash memory, a hard disk drive (HDD), or other bulk storage device. The processor 400 of the resource manager 340 executes an operating system (OS) 404 and one or more applications 406 including a resource management application to manage resources between the client devices 320 and the server 330 as explained above with reference to FIGS. 1-5 and as explained below in further detail.

Specifically, the resource management application receives feedback from the server 330 (target) regarding the ability of a plurality of resources of the server 330 to service requests from one or more client devices 320. The feedback includes a metric indicative of a load of each of the plurality of resources of the server 330. The resource management application calculates weights for the resources based on the feedback. To service a request received from one of the client devices 320, the resource management application selects one of the resources in round robin manner based on the weights of the resources to evenly utilize the plurality of resources.

More specifically, the weight for a resource is calculated as $(a*b^{(load-minLoad)})$, which is explained above in detail, and the explanation of the weight calculation is therefore not repeated for brevity. The weight is based on a product of a first term "a" that determines a maximum difference in probabilities of selection between two resources and a second term $b^{(load-minLoad)}$, which includes an exponent that is a difference between a current load of the resource and a current minimum load (minLoad) across all of the resources determined based on the feedback.

The first term "a" determines how likely an unloaded resource (e.g., with load less than a threshold) will be selected over a loaded resource (e.g., with load greater than a threshold). The second term "b" includes a number greater than 0 and less than or equal to 1 with the exponent (load-minLoad) and determines a rate at which a probability of selection of the resource decreases as the load of the resource increases. In other words, the second term "b" determines how quickly the probability of a resource will drop off as the load of the resource increases. The second term "b" essentially determines how the load of the resource translates into reduction in probability of selection of the resource.

As explained above in detail, the resource management application calculates an array from the weights of the resources using a cumulative distribution function. The resource management application selects a number within bounds of the array to select one of the resources. The explanation of calculating the array is therefore not repeated for brevity.

The resource management application calculates the current load of the resource (i.e., the term "load" used in the calculation of the weight $(a*b^{(load-minLoad)})$), based on a moving average of a predetermined number of metrics for the resource received during a predetermined time. The resource management application calculates the weight of the resource based on this current aggregated load of the resource. The resource management application allocates the selected resource for exclusive use by a single thread at a time or to be shared by a plurality of threads concurrently.

The resource management application receives an additional feedback from a client device 320 after the client device 320 uses a resource. For example, the additional feedback may indicate an inability of the resource used by the client device 320 to service a future request. The default value of the feedback may indicate to the server 330 to close the connection or to dispose the resource. However, if multiple resources are unhealthy (currently unable to service future requests), the value of the feedback may indicate to the server 330 to keep the used resource available to service future requests to prevent meltdown. The connection may still be closed by the client device 320 if it gets a well-known error that indicates that the resource does not exist due to a scaling down of the resources by the server 330.

In addition to closing the connection when a resource is unhealthy (high load), the resource management application may further segregated an unhealthy resource via a quarantine of the connection for a period of time so that the resource has time to cool down (wait till the load on the resource decreases, for example, to less than a threshold). If all of the resources are quarantined, the resource management application may perform the selection process across the quarantined connections.

The resource management application defines one or more configuration parameters for the resource manager 340. For example, the resource management application defines maximum lifetimes of the resources in a manner that prevents deletion of multiple resources at the same time (e.g., by adding skew to the maximum lifetimes). The resource management application defines a parameter to quarantine or discontinue using a resource for a period of time instead of deleting the resource based on the feedback; and the resource management application begins reusing the resource after the period of time. The resource management application defines a maximum time for which a resource is allocated so that the resource management application can reclaim the resource that remains allocated for more than the maximum time (orphaned resource). The resource management application defines maximum and minimum number of resources in the resource pool, and expands and contracts the resource pool by adjusting the number of resources between the maximum and minimum number of resources. The resource management application defines a maximum predetermined time (maximum wait time) within which to select a resource.

FIG. 10 shows a method 500 for managing resources according to the present disclosure. For example, the method 500 may be executed by the resource manager 102 of FIGS. 1 and 2, and the resource manager 340 of FIGS. 6 and 9. At 502, control receives feedback from a target including a metric indicative of load of each resource of the target. At 504, control calculates weights for the resources based on the feedback. At 506, to service a request, control selects a resource using an exponential weighted round robin method.

FIG. 11 shows an example of a method 550 for aggregating load, calculating weights, and selecting resources according to the present disclosure. For example, the method 500 may be executed by the resource manager 102 of FIGS. 1 and 2, and the resource manager 340 of FIGS. 6 and 9. At 552, based on feedback received from a target including a metric indicative of load of each resource of the target, control aggregates load values for the resources using a moving average method to determine current loads of the resources (the term "load" used in weight calculation). At 554, control determines a minimum load across all the resources (the term "minLoad" used in weight calculation).

At 556, control selects a load multiplier (the term "a" used in weight calculation). At 558, control selects the base "b" for the exponent term ($b^{(load-minLoad)}$) used in weight calculation. At 560, control calculates weights using the formula $a*(b^{(load-minLoad)})$ for each of the resources. At 562, control generates an array from the weights using a cumulative distribution function. At 564, control selects a random number within the bounds of the community distribution function and selects a resource with cumulative weight greater than or equal to the random number.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

In this application, apparatus elements described as having particular attributes or performing particular operations are specifically configured to have those particular attributes and perform those particular operations. Specifically, a description of an element to perform an action means that the element is configured to perform the action. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a processor and memory; and
   an application executed by the processor and memory, the application configured to:
      receive feedback from a target regarding ability of a plurality of resources of the target to service requests from one or more clients, the feedback including a metric indicative of a load of each of the resources;
      calculate weights for the resources based on the feedback, wherein a weight for a resource is based on a product of a first term that determines a maximum difference in probabilities of selection between two resources and a second term including an exponent that is a difference between a current load of the resource and a current minimum load across the resources determined based on the feedback; and
      select, for servicing a request from one of the clients, one of the resources in round robin manner based on the weights of the resources to evenly utilize the plurality of resources.

2. The system of claim 1 wherein the application is further configured to:
   calculate an array from the weights of the resources using a cumulative distribution function; and
   select a number within bounds of the array to select one of the resources.

3. The system of claim 1 wherein the application is further configured to:
   calculate the current load of the resource based on a moving average of a predetermined number of metrics for the resource received during a predetermined time; and
   calculate the weight of the resource based on the current load of the resource.

4. The system of claim 1 wherein the application is further configured to allocate the selected resource for use by a single thread at a time or by a plurality of threads concurrently.

5. The system of claim 1 wherein the second term includes a number greater than 0 and less than or equal to 1 with the exponent and determines a rate at which a probability of selection of the resource decreases as the load of the resource increases.

6. The system of claim 1 wherein the application is further configured to:
   receive an additional feedback from a client after the client uses a resource, the additional feedback indicating inability of the used resource to service a future request; and
   in response to one or more of the resources being currently unable to service the future request, keep the used resource available to service the future request based on the additional feedback.

7. The system of claim 1 wherein the application is further configured to determine maximum lifetimes of the resources in a manner that prevents deletion of multiple resources at the same time based on the feedback.

8. The system of claim 1 wherein the application is further configured to:
   discontinue using a resource for a period of time instead of deleting the resource based on the feedback; and
   begin reusing the resource after the period of time.

9. The system of claim 1 wherein the application is further configured to:
   define a maximum time for which a resource is allocated; and
   reclaim the resource that remains allocated for more than the maximum time.

10. The system of claim 1 wherein the application is further configured to define maximum and minimum number of resources and to adjust a number of resources between the maximum and minimum number of resources.

11. The system of claim 1 wherein the application is further configured to select a resource within a maximum predetermined time.

12. A method executed by a server for managing resources of a target servicing requests from one or more clients, the method comprising:
   receiving feedback from the target regarding ability of the resources of the target to service requests from the one or more clients, the feedback including a metric indicative of a load of each of the resources;
   calculating weights for the resources based on the feedback, wherein a weight for a resource is based on a product of a first term that determines a maximum difference in probabilities of selection between two resources and a second term including an exponent that is a difference between a current load of the resource and a current minimum load across the resources determined based on the feedback; and
   selecting, for servicing a request from one of the clients, one of the resources in round robin manner based on the weights of the resources to evenly utilize the resources.

13. The method of claim 12 further comprising:
   calculating an array from the weights of the resources using a cumulative distribution function; and
   selecting a number within bounds of the array to select one of the resources.

14. The method of claim 12 further comprising:
   calculating the current load of the resource based on a moving average of a predetermined number of metrics for the resource received during a predetermined time; and
   calculating the weight of the resource based on the current load of the resource.

15. The method of claim 12 further comprising allocating the selected resource for exclusive use by a single thread at a time or by a plurality of threads concurrently.

16. The method of claim 12 wherein the second term includes a number greater than 0 and less than or equal to 1 with the exponent and determines a rate at which a probability of selection of the resource decreases as the load of the resource increases.

17. The method of claim 12 further comprising:
   receiving an additional feedback from a client after the client uses a resource, the additional feedback indicating inability of the used resource to service a future request; and
   in response to one or more of the resources being currently unable to service the future request, keeping the used resource available to service the future request based on the additional feedback.

18. The method of claim 12 further comprising:
determining maximum lifetimes of the resources in a manner that prevents deletion of multiple resources at the same time based on the feedback;
discontinuing using a resource for a period of time instead of deleting the resource based on the feedback and beginning reusing the resource after the period of time;
defining a maximum time for which a resource is allocated and reclaiming the resource that remains allocated for more than the maximum time;
defining maximum and minimum number of resources and adjusting a number of resources between the maximum and minimum number of resources; and
selecting a resource within a maximum predetermined time.

19. A server configured to execute an application for managing resources of a target servicing requests from one or more clients, the server comprising:
a processor and memory configured to execute the application,
wherein the application executed by the processor and memory is configured to:
receive feedback from the target regarding ability of the resources of the target to service requests from the one or more clients, the feedback including a metric indicative of a load of each of the resources;
calculate a current load of each of the resources based on a moving average of a predetermined number of metrics for the respective resources received from the target during a predetermined time;
calculate weights for the resources based on the feedback, wherein a weight for a resource is based on a product of a first term that determines a maximum difference in probabilities of selection between two resources and a second term that includes a number greater than 0 and less than or equal to 1 with an exponent that is a difference between the current load of the resource and a current minimum load across the resources determined based on the feedback; and
select, for servicing a request from one of the clients, one of the resources in round robin manner based on the weights of the resources to evenly utilize the resources.

20. The server of claim 19 wherein the application is further configured to:
calculate an array from the weights of the resources using a cumulative distribution function; and
select a number within bounds of the array to select one of the resources.

* * * * *